(12) United States Patent
Byun et al.

(10) Patent No.: US 10,833,735 B2
(45) Date of Patent: Nov. 10, 2020

(54) METHOD AND DEVICE FOR RECEIVING SIGNAL IN WIRELESS COMMUNICATION SYSTEM TO WHICH MULTIPLEX TRANSMISSION TECHNIQUE IS APPLIED

(71) Applicant: LG ELECTRONICS INC., Seoul (KR)

(72) Inventors: Ilmu Byun, Seoul (KR); Jiwon Kang, Seoul (KR); Heejeong Cho, Seoul (KR); Jaehoon Chung, Seoul (KR); Genebeck Hahn, Seoul (KR); Heejin Kim, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 16/307,893

(22) PCT Filed: Jun. 19, 2017

(86) PCT No.: PCT/KR2017/006399
§ 371 (c)(1),
(2) Date: Dec. 6, 2018

(87) PCT Pub. No.: WO2017/222256
PCT Pub. Date: Dec. 28, 2017

(65) Prior Publication Data
US 2019/0260424 A1    Aug. 22, 2019

Related U.S. Application Data

(60) Provisional application No. 62/353,573, filed on Jun. 23, 2016.

(51) Int. Cl.
*H04B 7/024*    (2017.01)
*H04L 5/00*    (2006.01)
(Continued)

(52) U.S. Cl.
CPC .......... *H04B 7/024* (2013.01); *H04L 5/0035* (2013.01); *H04L 27/26* (2013.01);
(Continued)

(58) Field of Classification Search
CPC ............... H04L 5/0032; H04L 5/0035; H04W 36/0069; H04B 7/024
See application file for complete search history.

(56) References Cited

U.S. PATENT DOCUMENTS

2010/0173660 A1    7/2010    Liu et al.
2013/0077521 A1    3/2013    Feng et al.
(Continued)

OTHER PUBLICATIONS

PCT International Application No. PCT/KR2017/006399, International Search Report dated Sep. 12, 2017, 4 pages.
(Continued)

*Primary Examiner* — Ashley Shivers
(74) *Attorney, Agent, or Firm* — Lee Hong Degerman Kang Waimey

(57) ABSTRACT

A method and device for receiving a signal in a wireless communication system to which a multiplex transmission technique is applied are provided. The wireless communication system proposed herein suggests a method for increasing the receipt reliability of a terminal with respect to a multiplex transmission activation indicator indicating the start of multiplex transmission. Particularly, a terminal checks the receipt of a multiplex transmission activation indicator transmitted, from a first base station, for every predetermined subframe. If the terminal succeeds in receiving the multiplex transmission activation indicator, an ACK signal associated with the multiplex transmission activation indicator is transmitted to the first base station. Here, the multiplex transmission activation indicator indicates that the first base station and a second base station are capable of
(Continued)

transmitting the same data for a predetermined time together.

13 Claims, 13 Drawing Sheets

(51) Int. Cl.
 *H04L 27/26* (2006.01)
 *H04B 7/02* (2018.01)
(52) U.S. Cl.
 CPC ............ *H04L 27/2601* (2013.01); *H04B 7/02* (2013.01); *H04L 5/0055* (2013.01)

(56) References Cited

U.S. PATENT DOCUMENTS

| | | |
|---|---|---|
| 2013/0235804 A1 | 9/2013 | Kwon et al. |
| 2013/0322376 A1 | 12/2013 | Marinier et al. |
| 2015/0373572 A1* | 12/2015 | Sahin .................... H04W 16/10 370/252 |
| 2016/0080985 A1* | 3/2016 | Uchino .................. H04B 7/024 370/332 |

OTHER PUBLICATIONS

Lenovo, "Frame structure design for new radio interface", R1-164652, 3GPP TSG RAN WG1 Meeting #85, May 2016, 3 pages.

\* cited by examiner

FIG. 10
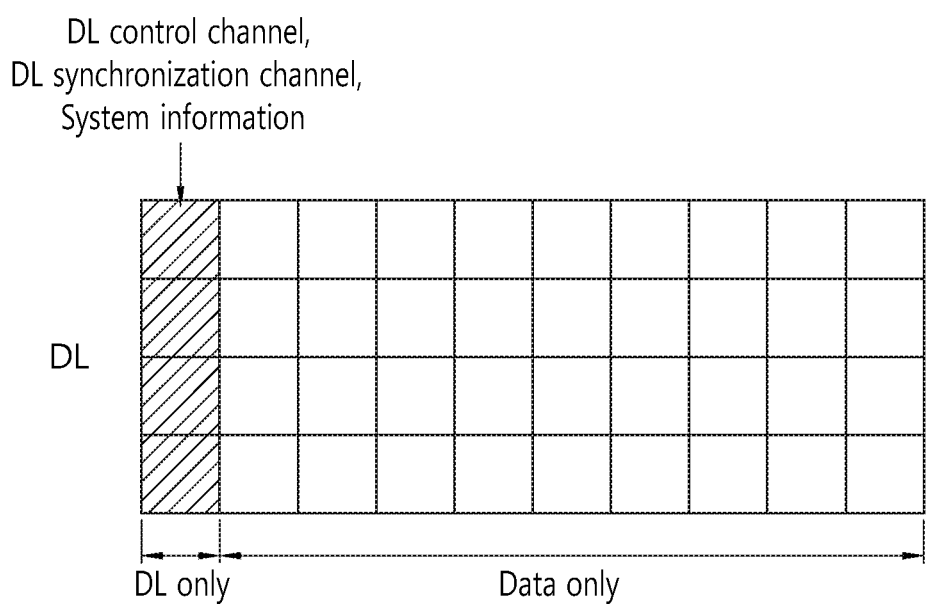
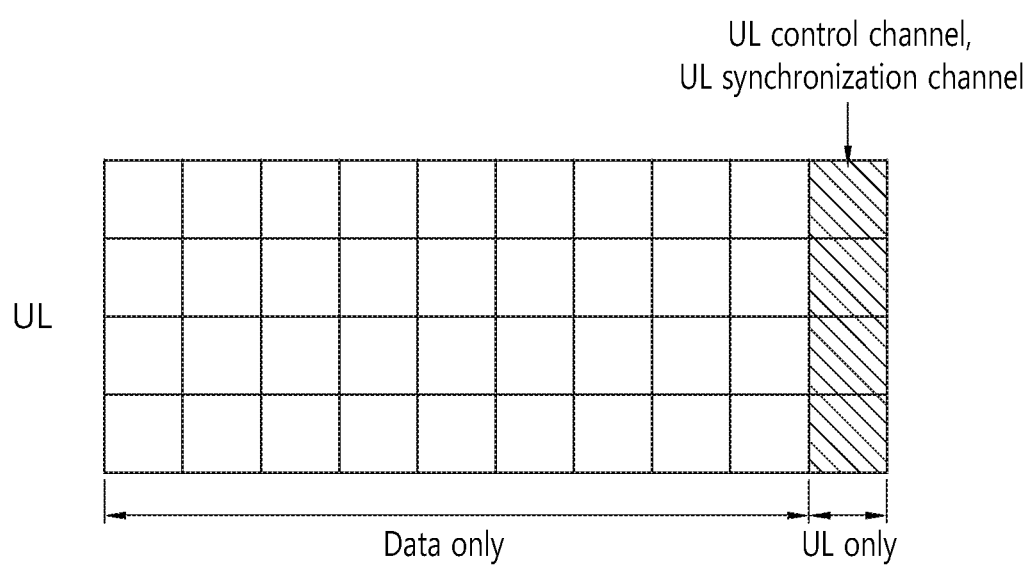

METHOD AND DEVICE FOR RECEIVING SIGNAL IN WIRELESS COMMUNICATION SYSTEM TO WHICH MULTIPLEX TRANSMISSION TECHNIQUE IS APPLIED

CROSS-REFERENCE TO RELATED APPLICATIONS

This application is the National Stage filing under 35 U.S.C. 371 of International Application No. PCT/KR2017/006399, filed on Jun. 19, 2017, which claims the benefit of U.S. Provisional Application No. 62/353,573, filed on Jun. 23, 2016, the contents of which are all hereby incorporated by reference herein in their entirety.

BACKGROUND OF THE INVENTION

Field of the Invention

The present invention relates to wireless communication and, most particularly, to a method for receiving a signal in a wireless communication system to which a multiple-transmission technique is applied, and a device using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A Coordinated Multi-Point system (hereinafter referred to as a system performing CoMP operations) refers to a system for enhancing throughput of a user being located at a cell boundary by applying enhanced multiple-input multiple-output (MIMO) transmission in a multi-cell environment. When a system performing CoMP operations is applied, inter-cell interference within a multi-cell environment may be reduced. If a system performing such CoMP operations is used, the user equipment (UE) may be capable of receiving shared data from a multi-cell base station.

However, in the next generation wireless communication systems, the issue of transmitting highly reliable data within a short period of time is becoming more important. Accordingly, manifold transmission for high reliability low latency communication may be taken into consideration.

SUMMARY OF THE INVENTION

Technical Objects

This specification provides a method and device for receiving a signal in a wireless communication system to which a multiple-transmission technique is applied.

Technical Solutions

This specification proposes a method and device for receiving a signal in a wireless communication system applying a manifold transmission (or multiple-transmission) technique (or method).

The device includes a radio frequency (RF) unit transmitting and receiving radio signals, and a processor being operatively connected to the RF unit.

The terms will first be described. A manifold transmission (or multiple transmission) method (or technique) refers to a technique for maximizing the number of signal transmission sessions and diversity within a limited time by using multiple paths. The manifold transmission may also be referred to multi-path transmission or manifold transmission. A first base station may correspond to the primary TRP, and a second base station may correspond to the secondary TRP. In this specification, a subframe may be replaced with a slot.

Firstly, the UE verifies a reception of a manifold transmission activation indicator, which is transmitted from a first base station at each predetermined subframe. The predetermined subframe may correspond to a predetermined time. The manifold transmission activation indicator indicates that the first base station and a second base station may transmit the same data during a predetermined time.

If the UE successfully receives the manifold transmission activation indicator, the UE transmits an ACK signal for the manifold transmission activation indicator to the first base station.

More specifically, the first base station may periodically transmit the manifold transmission activation indicator to the UE at a predetermined time interval. In other words, the first base station may notify the initiation (or activation) of the manifold transmitted to the UE through the manifold transmission activation indicator.

In order to allow the manifold transmission technique (or method) to be carried out preferably, the UE should receive the manifold transmission activation indicator with reliability. Therefore, the first base station should periodically transmit a manifold transmission activation indicator, and the UE should transmit an ACK signal for the received manifold transmission activation indicator even if the manifold transmission activation indicator corresponds to a control signal.

Thus, the UE may collectively receive the data being transmitted from the first base station and the second base station through multiple paths (a path between the UE and the first base station and a path between the UE and the second base station), without establishing any inter-cell cooperation between the first base station and the second base station.

Additionally, the manifold transmission method may use two level DCI. Herein, the manifold transmission activation indicator may be delivered by using level 1 DCI, and control information (scheduling information) for the transmission of a transport block may be delivered by using level 2 DCI.

Additionally, the manifold transmission activation indicator may be transmitted by using a sequence. At this point, the UE may calculate an auto-correlation value of the corresponding sequence. If the calculated auto-correlation value is equal to or greater than a threshold value, it will be determined that the manifold transmission activation indicator has been successfully received. Thus, the UE may determine that the manifold transmission is activated.

Additionally, the control information for the data transmission may be received through the predetermined subframe along with the manifold transmission activation indicator. The predetermined subframe may correspond to a self-contained subframe. More specifically, the predetermined subframe may include a symbol transmitting downlink control information, a symbol transmitting the data, and a symbol transmitting the uplink control information channel. In case of a self-contained subframe in the TDD communication system, the symbol transmitting downlink control information, the symbol transmitting the data, and the symbol transmitting the uplink control information channel of the predetermined subframe may each be positioned in a time-division format.

At this point, the manifold transmission activation indicator and the control information for transmitting the data may be received through a symbol transmitting the downlink control information. More specifically, the control information for the data transmission may be transmitted through the same control channel (e.g., PDCCH) along with the manifold transmission activation indicator. In this case, the UE may be assigned with both an ACK/NACK resource for the data and an ACK/NACK resource for the manifold transmission activation indicator. In other words, an ACK signal for the data and an ACK signal for the manifold transmission activation indicator may be transmitted through the symbol transmitting the uplink control information. Accordingly, a manifold transmission activation indicator and an ACK signal for the manifold transmission activation indicator may be transmitted through the same self-contained subframe.

Additionally, the symbol transmitting the downlink control information may be configured of at least two Orthogonal Frequency Division Multiplexing (OFDM) symbols, or the symbol transmitting the uplink control information may be configured of at least two OFDM symbols. This is to ensure that, if the first base station fails to receive the ACK signal for the manifold transmission activation indicator, a time interval between a time point where the ACK signal is received and a time point where the manifold transmission activation indicator is retransmitted is equivalent to at least one OFDM symbol. Thus, the encoding time for retransmitting the manifold transmission activation indicator may be ensured.

Additionally, a position of a resource from which the ACK signal for the manifold transmission activation indicator may be determined based on an index of the resource from which the manifold transmission activation indicator is transmitted and a sequence number of the manifold transmission activation indicator.

Additionally, the first base station and the second base station may be included in a base station group supporting the manifold transmission. The UE may receive information on the base station group, information on a resource position of a synchronization signal being transmitted by the first base station, and information on a resource position of a synchronization signal being transmitted by the second base station from the first base station. Based on the information on a resource position of a synchronization signal being transmitted by the first base station and the information on a resource position of a synchronization signal being transmitted by the second base station, the first base station and the second base station may be synchronization. In the next generation wireless communication system, as multiple numerologies are adopted to a single carrier, the transmission resource position from which the synchronization signal is transmitted may differ in each base station. Therefore, the UE is required to receive the information on the resource position of a synchronization signal along with information on a base station group including a list indicating each of the base stations.

Additionally, the manifold transmission activation indicator may be transmitted by using sequences that are orthogonal or quasi-orthogonal to one another through a resource being commonly assigned to the first base station and the second base station. Even if the manifold transmission activation indicator is transmitted from each base station through the same resource, since sequences being orthogonal or quasi-orthogonal to one another are used, the interference between each of the base station may be prevented.

Additionally, if the UE successfully receives the manifold transmission activation indicator, the UE may also transmit an ACK signal for the manifold transmission activation indicator to the second base station. This is to allow the UE to gain macro diversity by transmitting ACK signals to all of the base stations performing the manifold transmission.

An ACK signal for the manifold transmission activation indicator may be transmitted to each of the first base station and the second base station frim resources respectively configured to the corresponding base station, or an ACK signal for the manifold transmission activation indicator may be transmitted from a resource that is commonly assigned to both the first base station and the second base station. A resource from which an ACK signal for the manifold transmission activation indicator is being transmitted may be determined by using a resource that is used by the first base station when transmitting the manifold transmission activation indicator and a sequence index. The pre-arranged rule is received in advance by the UE from the first base station via L2/L3 signaling.

Effects of the Invention

When using the proposed technique (or method), by increasing the number of transmissions of a packet and the diversity within a restricted (or limited) period of time, a packet transmission likelihood may be increased within a target time.

BRIEF DESCRIPTION OF THE DRAWINGS

FIG. 10 shows an exemplary structure of a self-contained frame in an FDD communication system according to an exemplary embodiment of this specification.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), and so. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
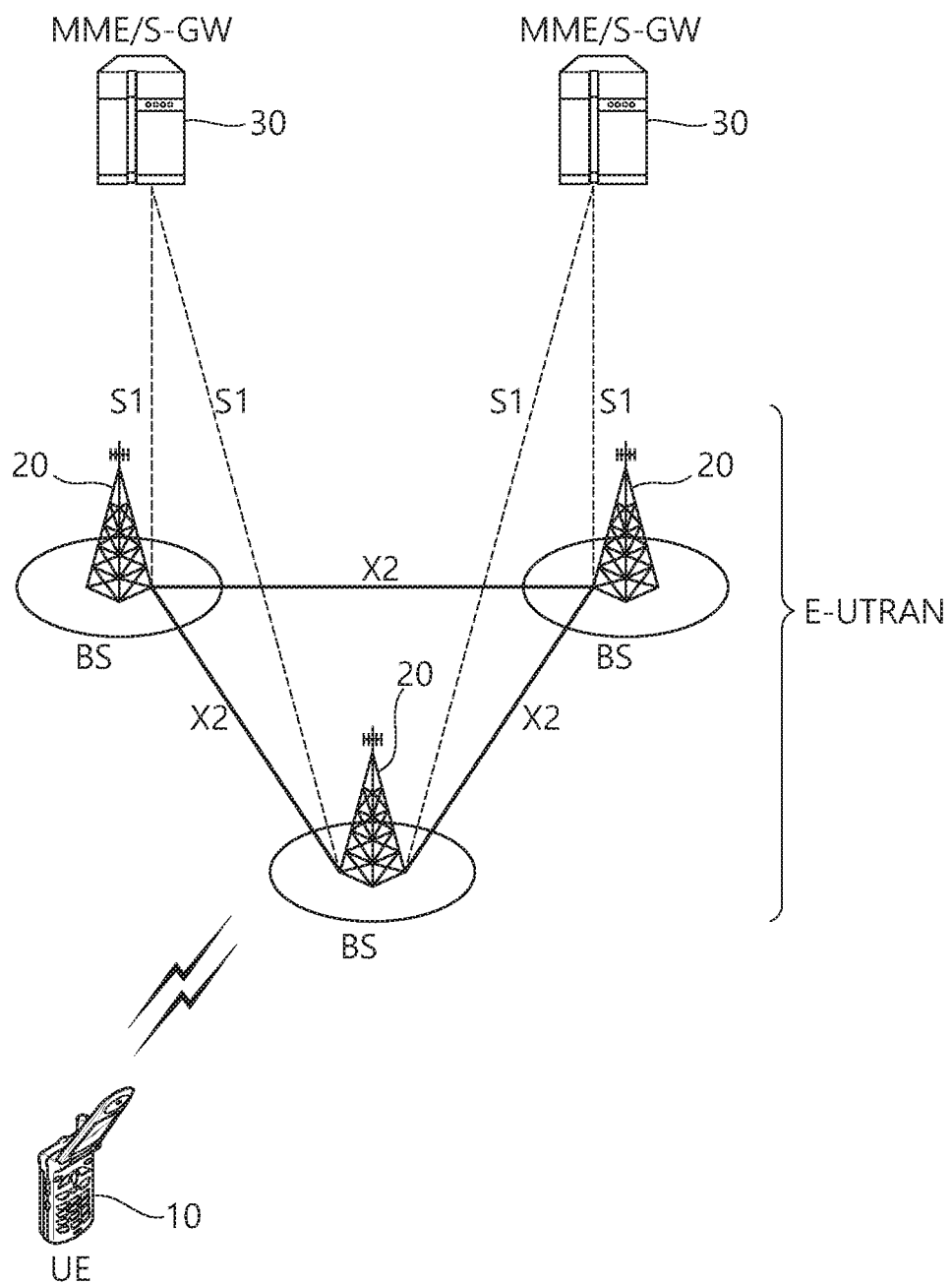
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, and so on. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
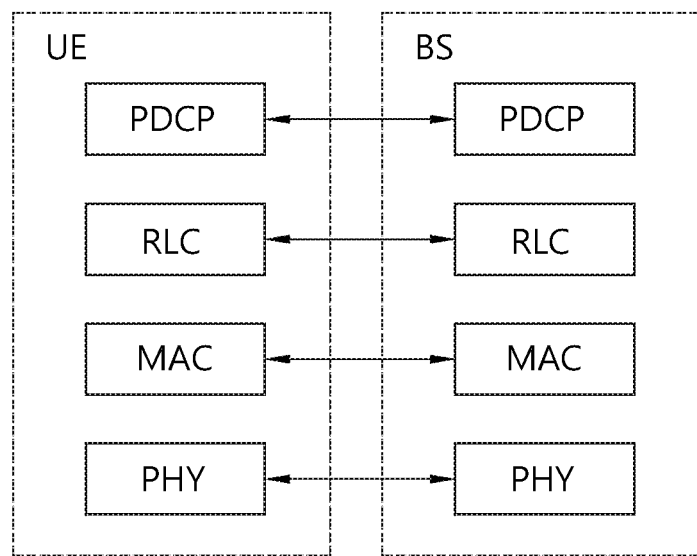
FIG. 2 is a diagram illustrating a radio protocol architecture for a user plane.
Figure 3:
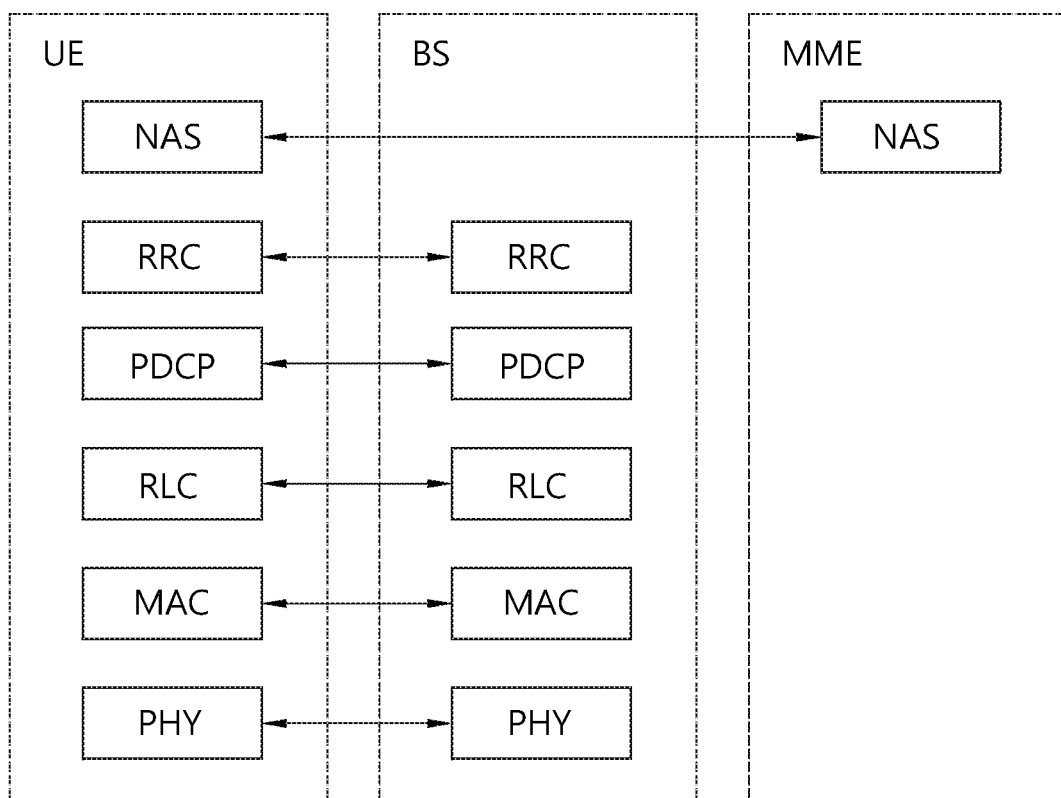
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
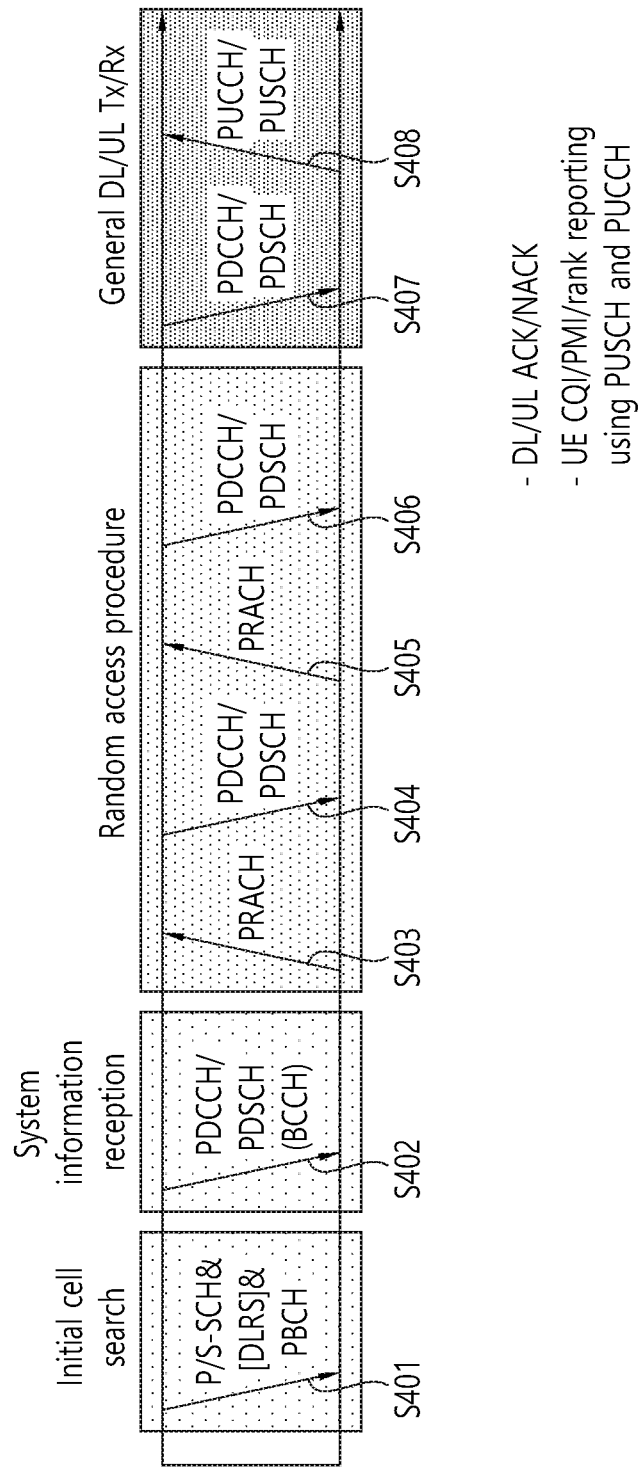
FIG. 4 is a diagram describing a physical channel and a method for transmitting signals by using the physical channel.

FIG. 4 is a diagram describing a physical channel and a method for transmitting signals by using the physical channel.

When power of a user equipment (UE) is turned on from a state in which the power of the UE was turned off, or when a UE newly enters (or accesses) a cell, the UE equipment performs an initial cell search process, such as synchronizing itself with the base station, and so on (S401). In order to do so, the UE may receive a primary synchronization channel (P-SCH) and a secondary synchronization channel (S-SCH) from the base station, thereby being capable of synchronizing itself with the base station and acquiring information, such as cell ID. Thereafter, the UE may receive a physical broadcast channel (PBCH), thereby being capable of acquiring broadcast information within the cell. Meanwhile, the UE may receive a downlink reference signal (DL RS), during the step of performing the initial cell search, so as to verify (or check) the downlink channel status.

Once the UE has completed the initial cell search, the corresponding UE may receive a PDDCH and a PDSCH, thereby being capable of acquiring more detailed system information (S402).

Meanwhile, in case the UE accesses the base station for the first time (or in case the UE performs an initial access to the base station), or in case there is no radio resource, the UE may perform a random access procedure, such as in step S403 to step S406. In order to do so, the UE may transmit a specific sequence through a PRACH as a preamble (S403), and then the UE may receive a response message respective to the random access through the PDCCH and its corresponding PDSCH (S404). In case of a contention based random access excluding the case of a handover, the UE may perform a contention resolution procedure, such as additional PRACH transmission (S405) and PDCCH/PDSCH reception (S406) that follow.

After performing the above-described procedures, the UE may perform PDCCH/PDSCH reception (S407) and PUSCH/PUCCH transmission (S408) as a general uplink/downlink signal transmission procedure. At this point, control information being transmitted to the base station via uplink or control information being received by the UE from the base station includes downlink/uplink ACK/NACK signals, a channel quality indicator (CQI), a precoding matrix index (PMI), a rank indicator (RI), and so on.

Hereinafter, a coordinated multi-point (CoMP) operation will be described in detail.

In the 3GPP LTE, the CoMP method for uplink or downlink may be broadly divided into two groups. Hereinafter, the CoMP method for downlink will only described for simplicity.

First, there is a multi-point coordination, which corresponds to a method wherein, although coordination (or adjustment), such as scheduling, link adaptation, and so on, may be performed between multiple transmission points, the transmission itself is performed from one specific transmission point. Additionally, there is also a multi-point transmission, which corresponds to a method wherein the transmission to one UE may be performed from multiple transmission point by using the CoMP method. The transmission may be dynamically performed between different transmission points by switching (or alternating) to and from one another. Alternatively, the transmission may be collectively performed from multiple transmission points.

More specifically, the multi-point coordination may coordinate the transmission from neighboring (or adjacent) transmission points in a scheduling viewpoint (whether or not to perform transmission or when to perform the transmission) or in a link adaptation viewpoint (at which rate the transmission is to be performed). However, it will be assumed that the transmission to a specific UE is still performed from only one specific transmission point.

Conversely in case of a multi-point transmission, the transmission to a specific UE may be performed from a plurality of transmission points each being different from one another. More specifically, the transmission points may be dynamically changed by using a dynamic point selection, or the transmission may be performed simultaneously from multiple transmission points by using a joint transmission method.

Hereinafter, the multi-point transmission will be described in more detail.

Figure 5:
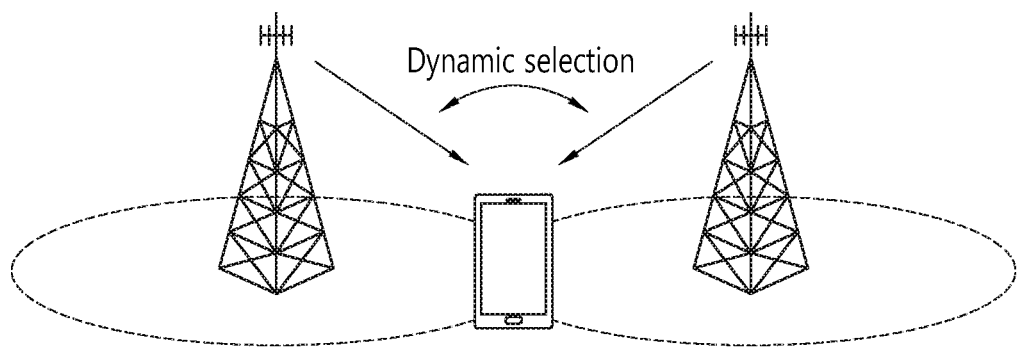
FIG. 5 is a diagram showing an example of performing a CoMP operation by using a dynamic point selection method between two transmission points.

FIG. 5 is a diagram showing an example of performing a CoMP operation by using a dynamic point selection method between two transmission points.

In the dynamic point selection method shown in FIG. 5, although the transmission is performed from a single transmission point, the corresponding transmission point may be dynamically changed.

In 3GPP LTE, all CoMP methods including the dynamic point selection method are performed based on the usage of Transmission Mode 10. Therefore, in the dynamic point selection method, channel estimation is performed through a DM-RS, and, as a result, the UE is no longer required to be informed (or aware) of the change in the transmission point. At this point, although the transmission corresponds to a simple PDSCH transmission, for the UE, when the transmission point is changed, the UE may regard such change as an abrupt change in the channel status. Essentially, for the UE, the operation may be performed identically as a case of beamforming using precoding that is not based on a codebook.

In order to assist on (or help) the dynamic point selection operation in the downlink, the UE shall provide a CSI report on the multiple transmission points. Similar to the link adaptation coordination and the scheduling coordination, the CSI report may be acquired by configuring a plurality of CSI processes in the UE.

In case of the link adaptation coordination and the scheduling coordination, CQI processes each being different from one another shall correspond to the same transmission point. In other words, a CSI-RS set should be identical for a plurality of different processors. Additionally, when making a decision on the transmission of adjacent transmission pints, different assumptions are applied so as to measure the interference. And, in order to perform the CSI report, the CSI-IM resource should vary for each of the plurality of processors.

Conversely, in order to support the dynamic point selection, different CSI processors shall respectively provide a CSI report corresponding to each of the transmission points. Therefore, the CSI-RS sets of the different processes shall be different from one another, and each of the CSI-RS sets shall correspond to different transmission points at which the dynamic point selection is being performed.

Figure 6:
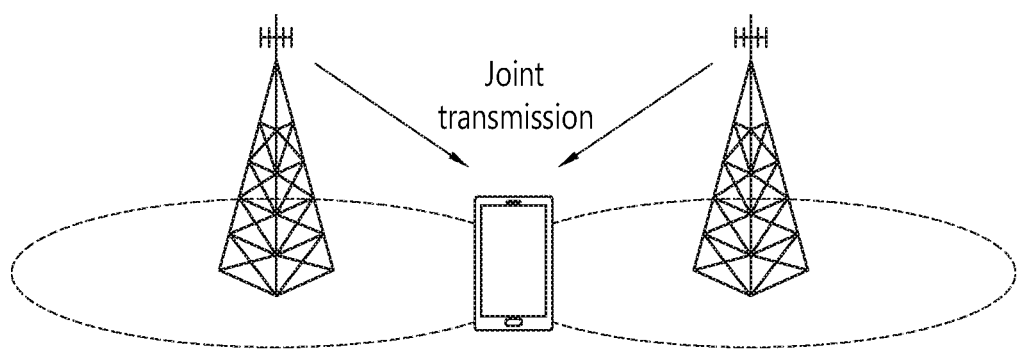
FIG. 6 is a diagram showing an example of performing a CoMP operation by using a joint transmission method between two transmission points.

FIG. 6 is a diagram showing an example of performing a CoMP operation by using a joint transmission method between two transmission points.

The joint transmission method shown in FIG. 6 represents a method wherein multiple transmission points perform transmission to the same UE at the same time. The joint transmission method may be divided into a coherent joint transmission and a non-coherent joint transmission.

In the coherent joint transmission, since the network is informed of detailed channel information from two or more transmission points, which are involved in the joint transmission, to the corresponding UE, the network may select a transmission weight (or transport weight) accordingly (e.g., the transmission weight may be selected to that the energy at the UE position can be maximized). Therefore, the coherent joint transmission may be regarded as a method wherein antennas participating in the beamforming correspond to each of the different transmission points instead of being positioned in one location.

Conversely, in the non-coherent joint transmission, it will be assumed that the network does not use the detailed channel information when performing the joint transmission. Therefore, the gain that is acquired from the non-coherent joint transmission corresponds to a power gain, which is simply obtained by adding the power of the multiple transmission points performing transmission to the UE. Such gain may vary depending upon whether or not it is more advantageous to use the power of the second transmission point when performing transmission for other UEs, or such gain may also vary depending a potential interference to another transmission that may exist in case the power of the second transmission point is additionally used in the same UE. Actually, in the non-coherent joint transmission, a gain may exist only in case the load within the network is low. This is because, in this case, another UE in which the power of the second transmission point is to be used may not exist. And, alternatively, additional interference that may occur when the power of the second transmission point is additionally used in the same UE may not cause a significant problem.

Figure 7:
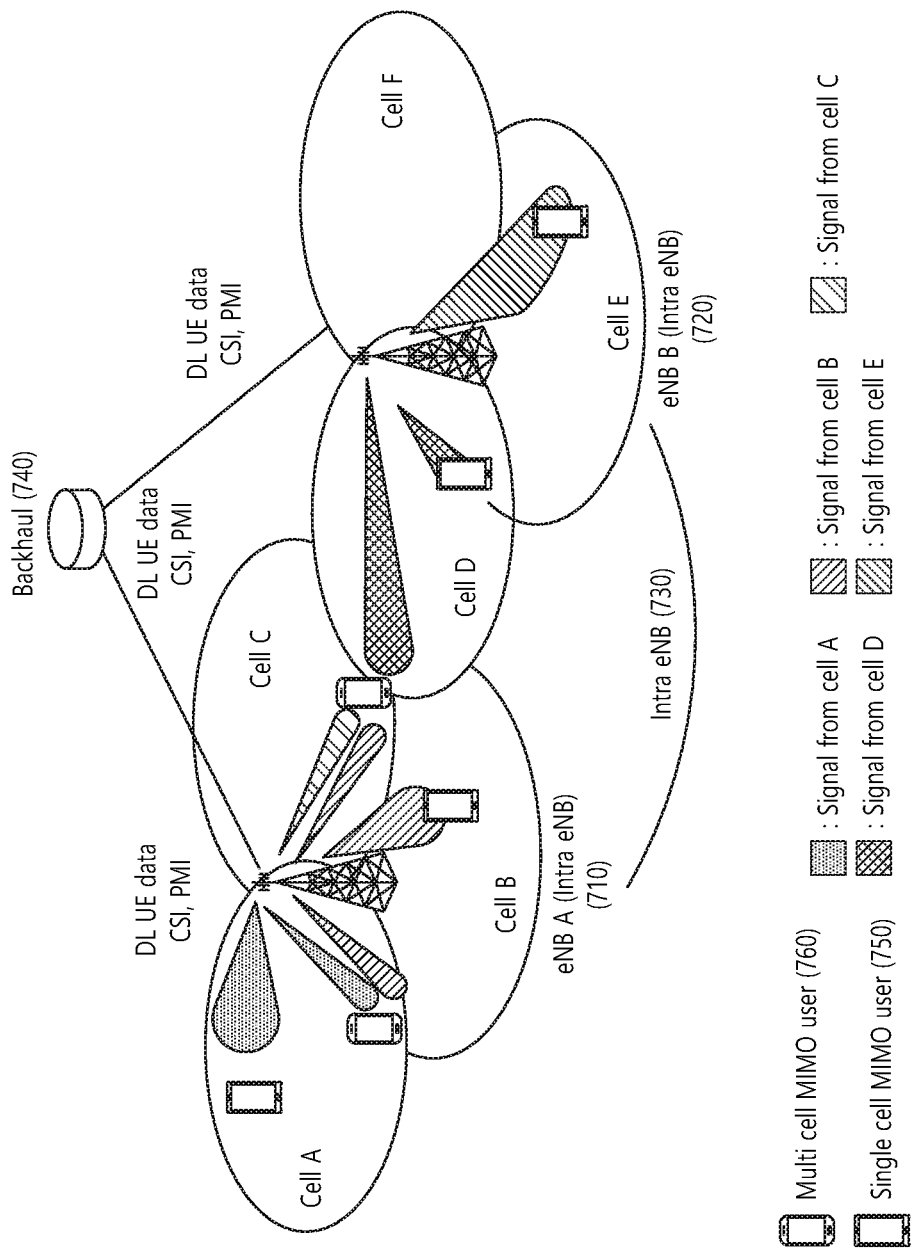
FIG. 7 is a diagram showing a procedure of performing a CoMP operation by an intra base station and an inter base station.

FIG. 7 is a diagram showing a procedure of performing a CoMP operation by an intra base station and an inter base station.

Referring to FIG. 7, intra base stations (or intra eNBs) (710, 720) and an inter base station (or inter eNB) (730) exist in a multi-cell environment. In LTE, the intra eNB is configured of a plurality of cells (or sectors). A cell that belongs to a base station (or eNB) to which a specific UE belongs is in a specific UE and an intra eNB (710, 720) relationship. In other words, a cell that shares the same eNB as a cell to which the UE belongs is referred to as a cell that corresponds to the intra eNB (710, 720), and a cell that belongs to another eNB is referred to as a cell that corresponds to the inter eNB (730). As described above, a cell that is based on a specific UE and the same base station (eNB) receives and transmits information (e.g., data, channel state information (CSI)) through an X2 interface, and so on. However, a cell that is based on another base station (eNB) may receive and transmit inter-cell information through a backhaul (740), and so on.

As shown in FIG. 7, a single cell MIMO user (750) existing within a single cell may perform communication with one serving base station in one cell (sector), and a multi-cell MIMO user (760) being positioned at a cell boundary may perform communication with multiple serving base stations within a multi-cell (sector).

Generally, under a multi-cell environment, when a method performing CoMP operations is used, the communication capability (or performance) of a cell boundary UE may be enhanced. Such method performing CoMP operations includes a Joint Processing (JP) method, which is configured of a coordinated MIMO format via data sharing, a Coordinated Scheduling/Coordinated Beamforming (CS/CB) method for reducing inter-cell interference, and so on. The Coordinated Scheduling/Coordinated Beamforming (CS/CB) method includes a worst companion method and a best companion method. Herein, the worst companion method corresponds to a method for eliminating (or cancelling) interference, wherein the UE performing CoMP operations reports a PMI having the largest interference on the cells, which perform the CoMP operations, to the serving base station, thereby allowing the corresponding cells to use a second (or next) best PMI excluding the reported PMI. And, the best companion method corresponds to a method for reducing inter-cell interference, wherein the UE performing CoMP operations reports a PMI having the smallest interference on the cells, which perform the CoMP operations, thereby allowing the inter-cell interference to be reduced by having the corresponding cells use the reported PMI.

As described above, the communication method performing CoMP operations is proposed in order to reduce inter-cell interference in a multi-cell environment and to enhance the capability of UEs positioned at cell boundaries. In order to do so, accurate channel estimation is required to be carried out based on reference signals received from multiple base stations. Most particularly, in case of using the method of performing CoMP operations, in order to allow the Coordinated Scheduling/Coordinated Beamforming (CS/CB) method as well as the Joint Processing (JP) method to be performed smoothly by a single feedback transmission, the UE is required to transmit signal intensity of a serving cell, signal intensity of a neighbor cell belonging to a group (or set) of cells performing CoMP operations, and intensity of noise and interference being generated from a cell other than the group (or set) of cells performing CoMP operations to the serving base station, and so on.

A cell boundary UE that performs the operations for performing the CoMP operations is required to transmit feedback information, which is needed to easily carry out the method for performing all CoMP operations (e.g., the Joint Processing (JP) method, the Coordinated Scheduling/Coordinated Beamforming (CS/CB) method, and so on) to the serving base station. When the UE transmits such feedback information, the overhead according to the complicated signaling may be reduced, and the UE and each cell performing the CoMP operations may be capable of efficiently performing diverse CoMP operations. In order to support this, the UE measures a CQI value between multiple cells and may send feedback related to the measured value to the serving base station, and so on.

The UE performing the CoMP operations may measure adequate CQI values corresponding not only to the serving cell performing the CoMP operations but also to the neighbor cells providing interference or preferable signals. And, then, the UE may send feedback on the measured values. Based on such CQI values, the serving base station may carry out a method for performing diverse CoMP operations. For this, the UE is required to measure the signal intensity of a serving cell, the signal intensity of a neighbor cell belonging to a group (or set) of cells performing CoMP operations, and the intensity of noise and interference being generated from a cell other than the group (or set) of cells performing CoMP operations and then transmit the measured values to the serving base station. If the UE is capable of measuring such values and sending feedback on such values to the serving base station, the serving base station may accurately calculate the CQI values not only for Coordinated Scheduling/Coordinated Beamforming (CS/CB) method but also for the Joint Processing (JP) method and may then perform optimal transmission.

The current cellular system is evolving from the fourth generation (4G) to the fifth generation (5G). In the usage of the $5^{th}$ generation communication, in addition to the evolution of the legacy smartphone-based mobile broadband services, requirements for supporting diverse Internet of Things (IoT) application services, such as healthcare, disaster management, vehicle communication, factory management, robot control, and so on, are being defined. In supporting the IoT application services, the issue of transmitting highly reliable data within a short period of time is becoming more important than the data rate, which was considered to be very important in the legacy communication system. Such type of service is referred to as an Ultra-Reliable Low Latency Communication (URLLC) in the 3GPP.

Hereinafter, the manifold transmission will be described in detail. The manifold transmission method corresponds to a method that maximizes the number of transmission sessions and diversity within a limited time by using multiple paths. The manifold transmission may also be referred to as a multi-path transmission or a manifold transmission. Hereinafter, the above-mentioned terms will be alternately used for describing the manifold transmission (or multiple transmission).

Figure 8:
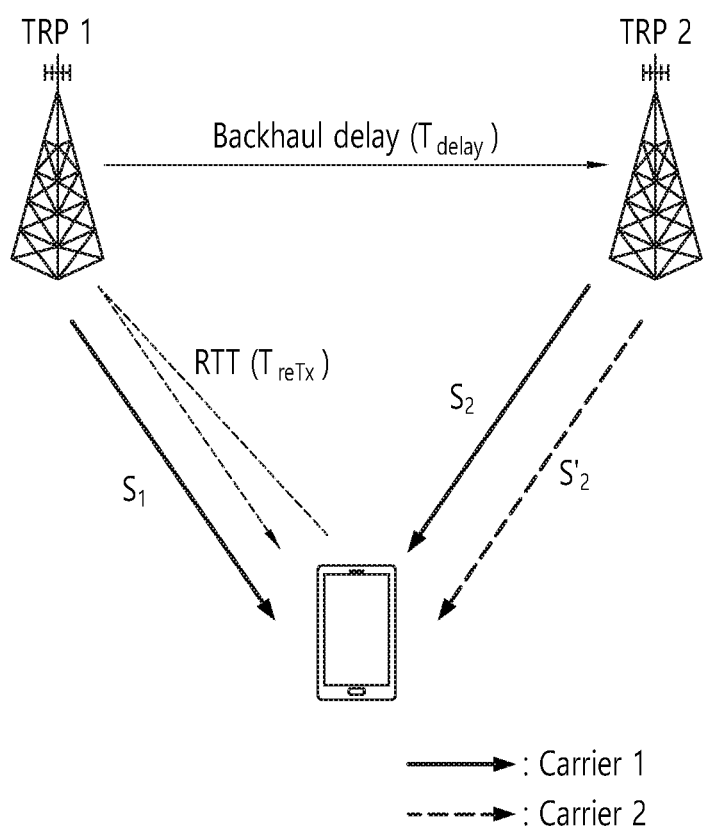
FIG. 8 is a diagram showing a comparison between a manifold transmission method and a CoMP operation according to an exemplary embodiment of this specification.

FIG. 8 is a diagram showing a comparison between a manifold transmission method and a CoMP operation according to an exemplary embodiment of this specification.

When the manifold transmission method of FIG. 8 is used, it is advantageous in that the transmission is more robust against backhaul delay (or latency) as compared to the legacy CoMP method, and that a larger number of transmission sessions can be performed within a limited time. In the next generation wireless communication system, the manifold transmission method uses a two level DCI. When performing physical layer scheduling, in the conventional method, the scheduling process was performed in a single level (or phase), which is configured of PDCCH, and so on, whereas, in the manifold transmission method, the two level DCI attempts to perform scheduling by using level 1 DCI and level 2 DCI, respectively. More specifically, in level 1 DCI, scheduling is performed for a manifold transmission activation indicator, and, in level 2 DCI, each TRP performs scheduling for the data (packet).

Additionally, in the legacy CoMP method, TRP 1 and TRP 2 perform scheduling after establishing coordination, whereas, in the manifold transmission method, TRP 1 and TRP 2 may perform scheduling freely. In case of the UE, the UE receives signal $S_1$, which is transmitted from TRP 1, and receives signal $S_2$, which is transmitted from TRP 2, as a retransmitted signal. In FIG. 8, Sx corresponds to a signal that is transmitted from TRP x and generated from the same information.

Table 1 shown below represents a comparison between signals being transmission by using the manifold transmission method and the legacy CoMP method within a limited time.

TABLE 1

| Time | t | $t + T_{delay}$ | $t + T_{reTx}$ | $t + T_{delay} + T_{reTx}$ | $t + 2T_{delay} + T_{reTx}$ |
|---|---|---|---|---|---|
| CoMP JT case 1 | | $S_1, S_2$ | | $S_1$ or $S_2$ | |
| CoMP JT case 2 | | $S_1, S_2$ | | | $S_1, S_2$ |
| Manifold Tx | $S_1$ | $S_2$ and/or $S'_2$ | $S_1$ | $S_2$ and/or $S'_2$ | |

In order to differentiate the signals, in Table 1, $S_1$ and $S_2$ represent signals being transmitted from Carrier 1, and $S'_2$ represents a signal being transmitted from Carrier 2.

Referring to Table 1, in the manifold transmission method, since the signal being transmitted equally corresponds to $S_1$ for both of a case where the limited time is equal to t and a case where the limited time is equal to $t+T_{reTx}$, it will be apparent that the transmission is not influenced by the backhaul delay (or latency). Additionally, in the manifold transmission method, since the signal being transmitted equally corresponds to $S_2$ and/or $S'_2$ for both of a case where the limited time is equal to $t+T_{delay}$ and a case where the limited time is equal to $t+T_{delay}+T_{reTx}$, it will be apparent that replicated transmission is possible in another TRP or another numerology or another carrier or another Radio Access Technology (RAT).

Although this specification is described by using a transmission and reception point (TRP), this specification will not be limited only to this. And, therefore, this specification may also be applied to any other similar device (or apparatus). For example, it will be possible to replace the TRP of this specification with a cell, a base station (eNB), a transmission point, an access point (AP), a radio unit, and so on.

In this specification, the UE may receive signals from a primary TRP and one or more secondary TRPs, and, for this, the primary TRP and the secondary TRP(s) are in a synchronized state. The primary TRP and the secondary TRP may use the same carrier or may each use a different carrier. Alternatively, the primary TRP and the secondary TRP may each correspond to a different RAT or may each have a different numerology. In case each of the primary TRP and the secondary TRP uses a different carrier, the primary TRP and the secondary TRP may physically correspond to the same device (or apparatus).

A numerology may correspond to diverse numeric values that can be used in a next generation communication system, which is used for the purpose of high reliability and low latency (or delay). For example, a numerology may correspond to a length of a subframe (TTI length), subcarrier spacing, a number of symbols in a subframe, and/or a CP length, and so on.

Additionally, a self-contained frame may be used in the wireless communication system that is proposed in this specification. Hereinafter, the self-contained frame will be described in detail.

Figure 9:
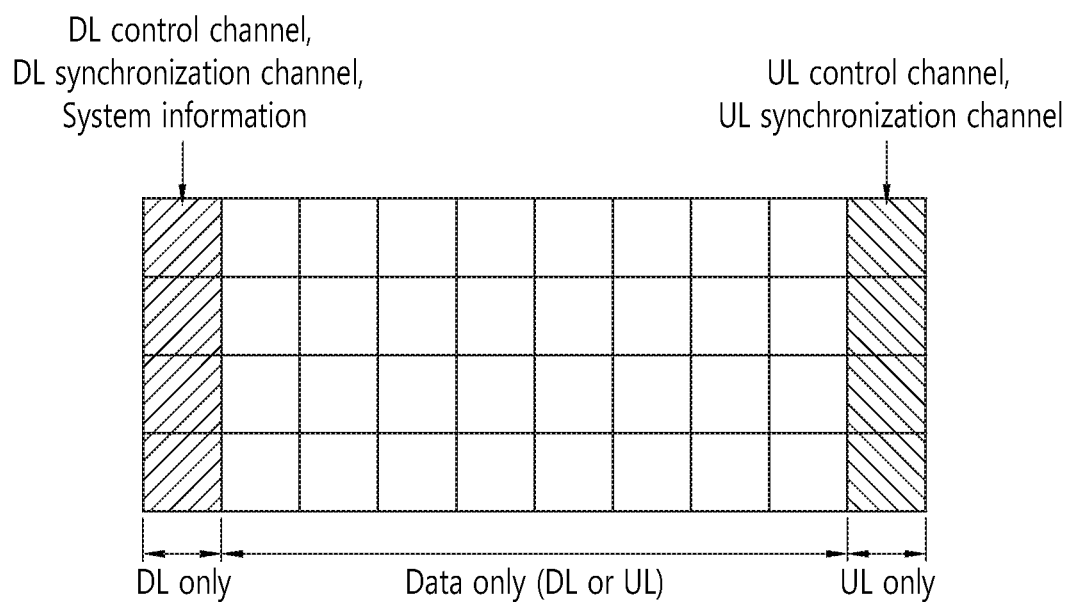
FIG. 9 shows an exemplary structure of a self-contained frame in a TDD communication system according to an exemplary embodiment of this specification.

FIG. 9 shows an exemplary structure of a self-contained frame in a TDD communication system according to an exemplary embodiment of this specification.

A data transmission delay (or latency) of 1 ms may be proposed as a low delay (or low latency) requirement of the next generation wireless communication system. In order to ensure a data transmission delay of 1 ms, a structure of a self-contained frame in which a downlink control channel and an uplink control channel always exist is being proposed. As shown in FIG. 9, in the structure of a self-contained frame, a control channel and a data channel are time-divided. In other words, the control channel and the data channel may be positioned by using the TDM method.

In the legacy LTE system, an uplink control channel and an uplink data channel are frequency-divided. Therefore, there were limitations in estimating the channel characteristics of an uplink data channel by using a reference signal of an uplink control channel. However, in a self-contained frame structure, since the uplink control channel and the uplink data channel are time-divided, it is possible to estimate the channel quality of the data channel by using a reference signal of the control channel. In order to perform channel estimation by using this characteristic, a method (or technique) of hopping the control channel has been proposed (Method of UL signal transmission for UL channel sounding). Additionally, since the downlink data channel and the uplink control channel are time-divided, it is possible to estimate the quality of the uplink control channel and the uplink data channel by using the quality information of the downlink channel. More specifically, when the above-described method is applied, the inter-channel similarity between the uplink control channel and the downlink data channel is increased due to the characteristic of channel reciprocity. It is possible to perform channel estimation for the uplink data transmission by using a reference signal of the uplink control channel.

FIG. 10 shows an exemplary structure of a self-contained frame in an FDD communication system according to an exemplary embodiment of this specification.

The self-contained frame structure is a frame structure that is designed for the TDD communication system. However, in order to reduce unnecessary (or redundant) overhead in a communication network supporting both the FDD and the TDD, the frame structures of the FDD and TDD may be shown to have similar structures. More specifically, as shown in FIG. 10, in the structure of a self-contained frame, a DL frame and a UL frame may be positioned in a frequency-division format. In a DL frame, the downlink control channel and data channel may be positioned in a time-division format, and, in a UL frame, the data channel and the uplink control channel may be positioned in a time-division format.

In this specification, a situation where a base station notifies an initiation of a manifold transmission to a user equipment (UE), which is receiving a signal from a single TRP, will be assumed. Since the indicator notifying the initiation of a manifold transmission (manifold transmission activation indicator) is only transmitted from a single TRP, macro diversity cannot be gained. At this point, the macro diversity may correspond to an antenna diversity between base stations being physically spaced apart from one another. Conversely, micro diversity may correspond to a diversity between antennas within a single base station.

However, if the UE fails to receive the indicator notifying the initiation of the manifold transmission, the manifold transmission cannot be initiated (or started). Therefore, the indicator notifying the initiation of the manifold transmission should satisfy a reception reliability that is required without macro diversity. This problem becomes more critical when the TRP and the UE experience deep fading.

Therefore, an object of this specification is to enhance the reception reliability when the UE receives an indicator indicating the initiation of the manifold transmission. Herein, the manifold transmission refers to a manifold transmission (or multiple transmission) technique (or method) performing asynchronous multi-cell transmission for high reliability communication.

Unlike in the legacy CoMP method, in the manifold transmission method, each TRP may respectively transmit a signal without establishing any cooperation between the TRPs within the TRP group. More specifically, if the primary TRP provides only the information on the number of transport blocks (or MAC packets) and the information on the time during which the manifold transmission can be performed, each of the primary TRP and the secondary TRPs may transmit a transport block to the UE without establishing any cooperation between one another. The UE may receive each of the transport blocks respectively transmitted from each of the primary TRP and the second TRPs as though the corresponding transport blocks have been retransmitted. Accordingly, the UE requires a retransmission process IP (PCID).

Figure 11:
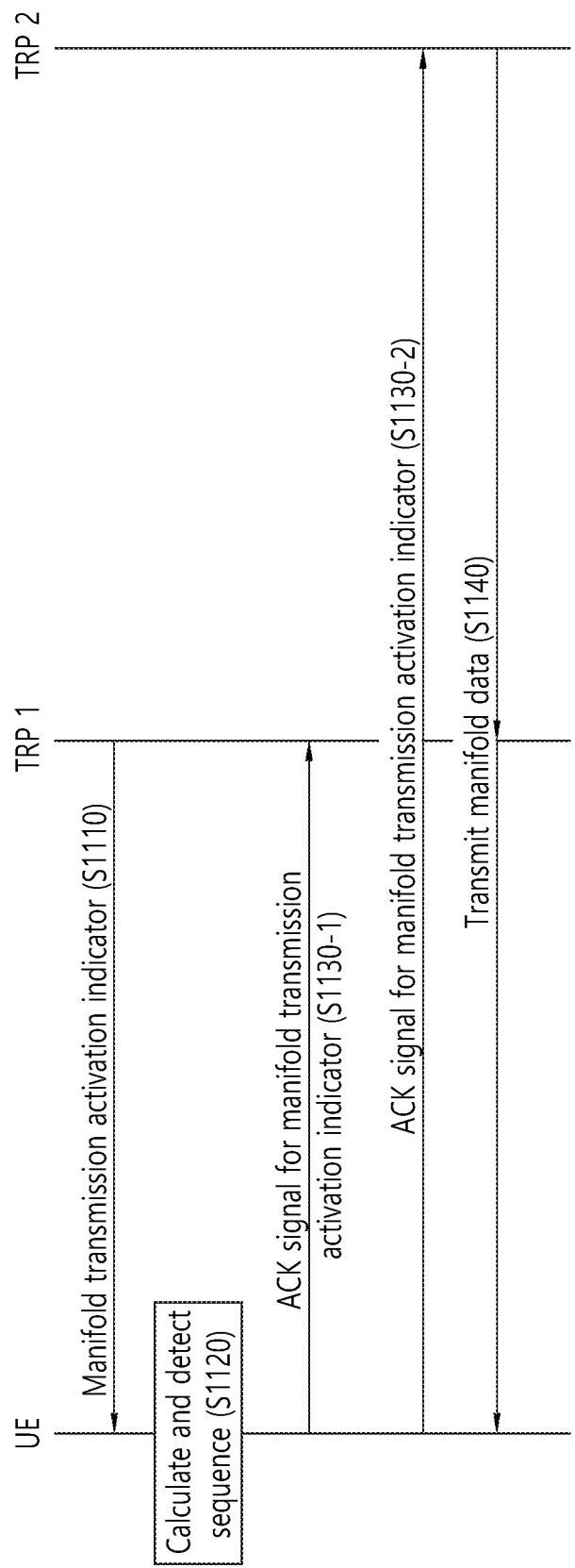
FIG. 11 shows an example of performing manifold transmission by using a manifold transmission activation indicator according to an exemplary embodiment of this specification.

FIG. 11 shows an example of performing manifold transmission by using a manifold transmission activation indicator according to an exemplary embodiment of this specification. Herein, FIG. 11 shows an example of a manifold transmission procedure of Proposed Technique 1 and Proposed Technique 2, which will hereinafter be described in detail. The Proposed Technique 2 corresponds to an exemplary embodiment wherein step S1130-2 is further performed in the Proposed Technique 1. TRP 1 of FIG. 11 may correspond to a primary TRP, and TRP 2 of FIG. 11 may correspond to a secondary TRP. TRP 1 and TRP 2 may belong to a TRP group applying the manifold transmission method.

—Proposed Technique 1—

For example, the primary TRP consistently transmits a manifold transmission activation indicator at an interval of time T until before an ACK signal is received (S1110). If the UE successfully receives the manifold transmission activation indicator, the UE responds to the primary TRP by transmitting an ACK signal for the manifold transmission activation indicator (S1130-1). More specifically, generally, although an ACK signal is not transmitted for a control signal, in this exemplary embodiment, an ACK signal is transmitted even for the control signal in order to enhance the reception reliability of the manifold transmission activation indicator.

As in carrier aggregation (CA) or DC, a user equipment that is not receiving any signal from carriers or TRPs, each being different from one another, may receive a signal only from the primary TRP. Therefore, the primary TRP is required to increase the likelihood for successfully receiving the manifold transmission activation indicator without the help (or assistance) of a neighboring TRP. For this, apart from the ACK/NACK signal related to data reception, by configuring an ACK/NACK signal corresponding to the manifold transmission activation indicator, this exemplary embodiment is designed to repeatedly (periodically) transmit the manifold transmission activation indicator.

The adoption of this exemplary embodiment has the following additional advantages. A case where the manifold transmission is activated, even though the UE has failed to receive the data transmitted from the primary TRP, may be notified to the primary TRP. Alternatively, a case where the reception of the manifold transmission activation indicator has failed, even though the primary TRP has successfully received the data transmitted from the primary TRP, may be notified to the primary TRP.

Once the UE receives the manifold transmission activation indicator, since the UE initiates monitoring of TRPs, which belong to a TRP group to which the manifold transmission technique can be applied, and carriers, additional information for the manifold transmission may be received through multiple paths. Therefore, the UE may receive data adopting the manifold transmission technique from the TRP 1 and TRP 2 (S1140).

In order to reduce transmission overhead of the manifold transmission activation indicator, the manifold transmission activation indicator has a 1-bit information or in an on/off keying format. For example, as information indicating the activation of the manifold transmission, the manifold transmission activation indicator may be generated as a sequence having the length of L. If an autocorrelation value of the sequence is equal to or greater than a threshold value, the UE determines that the manifold transmission is activated.

Generally, signals including information having a short length, such as a synchronization signal or a reference signal or a scheduling request, use a sequence. In the Proposed Technique 1, since the information of the manifold transmission activation indicator is limited only to the activation part, it is preferable to transmit the manifold transmission activation indicator by using a sequence.

Additionally, if the UE is connected to a high reliability service, or if the UE has received an indication from the base station in advance via L2/L3 signaling, the corresponding UE calculates an autocorrelation value of the sequence being included in the manifold transmission activation indicator at an interval of time T1 (S1120). The time T1 may be varied (or changed) in accordance with a delay requirement of a corresponding service, and the time T1 is indicated to the UE by the base station via L2/L3 signaling.

For example, when the UE receives indication that a bearer for the high reliability service has been generated and that the manifold transmission can be performed, the UE is required to attempt to perform detection of a sequence of the manifold transmission activation indicator at an interval of time T1. Herein, the time T1 is separately configured in accordance with a packet transfer (or delivery) time that is requested by each service. In the perspective of reducing delay (or latency), the UE may attempt to perform detection at each subframe. However, in this case, a large amount of overhead may be generated in the UE.

Additionally, the primary TRP may transmit a control signal for data transmission along with the manifold transmission activation indicator from the same control channel (e.g., PDCCH). More specifically, the data may be transmitted from the subframe from which the manifold transmission activation indicator is transmitted at the same time as the manifold transmission activation indicator. In this case, the UE may be assigned with both the ACK/NACK signal for the data and the ACK/NACK signal for the manifold transmission activation indicator.

The manifold transmission method corresponds to a method according to which the primary TRP transmits data before completing an inter-cell coordination. Therefore, the primary TRP may transmit a first transport block of the manifold transmission while transmitting the manifold transmission activation indicator at the same time. Even if the UE fails to receive the manifold transmission activation indicator, the UE that has received the transport block may attempt to decode the received transport block.

Additionally, a position from which the ACK for the manifold transmission activation indicator is transmitted may be designated as a transmission resource index (e.g., resource block index or control channel element index) of the manifold transmission activation indicator and a sequence number.

It is difficult for the UE to add information for designating the resource, through which the UE transmits the ACK/NACK signal to the base station, while transmitting the manifold transmission activation indicator. Therefore, it is required to designate an ACK/NACK transmission resource of the manifold transmission activation indicator in accordance with a pre-arranged rule. The manifold transmission activation indicator, which is received by different UEs within the same TRP, may be assigned with a different index of the transmission resource, or, in case the transmission resource is the same, the manifold transmission activation indicator may be assigned with a different sequence number. Therefore, it will be possible to designate an ACK/NACK transmission resource of a manifold transmission activation indicator by using the transmission resource and sequence number of the manifold transmission activation indicator.

Additionally, in a self-contained frame structure, the ACK/NACK signals for the manifold transmission activation indicator are transmitted from the same subframe. As shown in FIG. 9, the self-contained frame structure corresponds to a frame structure having both a downlink control channel and an uplink control channel existing therein in the same subframe. Since the overhead that is used by the UE for detecting a sequence of the manifold transmission activation indicator is not large, the UE may complete its sequence detection within a short period of time. Therefore, it will be possible for the UE to transmit an ACK/NACK for the manifold transmission activation indicator within the same subframe.

Additionally, in a self-contained frame structure applying the FDD system, an ACK/NACK for the manifold transmission activation indicator is transmitted from the nearest (or most approximate) uplink control channel. The self-contained frame structure is a frame structure that is designed for the TDD communication system. However, in order to reduce unnecessary (or redundant) overhead in a communication network supporting both the FDD and the TDD, the frame structures of the FDD and TDD may be shown to have similar structures. As shown in FIG. 10, in the FDD, in a downlink subframe, the downlink control channel and data channel may be positioned in a time-division format, and, in an uplink subframe, the data channel and the uplink control channel may be positioned in a time-division format.

Additionally, the primary TRP transmits a manifold transmission activation indicator from a downlink physical control channel (e.g., PDCCH) of each subframe. In the self-contained frame structure, the downlink control channel exists for each subframe. Therefore, basically, a manifold transmission activation indicator having a high level of urgency is transmitted from a downlink physical control channel. In this case, time T, which is described in the Proposed Technique 1, may be configured to have the same length as a subframe.

Additionally, in case the primary TRP fails to receive an ACK for the manifold transmission activation indicator, 1) the downlink physical control channel may be configured so that two or more OFDM symbols exist, or 2) the uplink physical control channel transmitting the ACK may be configured so that two or more OFDM symbols exist, so that the manifold transmission activation indicator can be transmitted from the next subframe. By doing so, an interval between the ACK and the manifold transmission activation indicator can be ensured to be equivalent to one OFDM symbol or more.

Since the manifold transmission activation indicator is a sequence having the length of L, the detection speed is very fast. And, if the TRP determines that it has failed to receive the ACK, it is possible to retransmit the ACK after a very short encoding time. However, since the encoding time exists, the manifold transmission activation indicator cannot be retransmitted to the next OFDM symbol immediately after a non-reception of the ACK. Therefore, it is required to ensure an interval of at least one OFDM symbol between the reception of the ACK and the retransmission of the manifold transmission activation indicator. For example, if the downlink physical control channel is configured of two OFDM symbols, and if the uplink physical control channel is configured of one OFDM symbol, the manifold transmission activation indicator may be transmitted to a second OFDM symbol of the downlink physical control channel. If the downlink physical control channel is configured of one OFDM symbol, and if the uplink physical control channel is configured of two OFDM symbols, the encoding time may be ensured by transmitting the ACK/NACK for the manifold transmission activation indicator to a preceding OFDM symbol within the uplink control channel.

As another example, when a subframe that has received the ACK for the manifold transmission activation indicator corresponds to n, the manifold transmission activation indicator is transmitted from Subframe n+1 regardless of the ACK. If it is determined that the signal received by the TRP corresponds to an ACK, the manifold transmission activation indicator is not transmitted starting from Subframe n+2. According to this exemplary embodiment, the TRP transmits the manifold transmission activation indicator twice. Since the traffic size for the manifold transmission activation indicator is not large, even if the manifold transmission activation indicator is transmitted at least twice, this does not cause any burden (or influence) the overhead. Unlike the above-described method, wherein the downlink physical control channel is configured to have two or more OFDM symbols, or wherein the uplink physical control channel is configured to have two or more OFDM symbols, this exemplary embodiment is advantageous in that there is no limitation in the configuration of the physical control channel. Nevertheless, this exemplary embodiment is also disadvantageous in that the TRP is always required to transmit the manifold transmission activation indicator twice and that unnecessary transmission of the manifold transmission activation indicator occurs.

As another example, the TRP designates a maximum number of transmission sessions for transmitting the manifold transmission activation indicator. If the maximum number of transmission sessions is exceeded, the TRP no longer transmits the manifold transmission activation indicator, and the TRP sends instructions to the UE for switching its connection to another TRP or for attempting re-connection to the current TRP or for releasing (or cancelling) its connection to the current TRP.

In case the TRP continuously fails to send a response to the manifold transmission activation indicator, it may be understood that the channel status between the UE and the primary TRP is poor. At this point, instead of continuously attempting to perform transmission of the ACK, it may be preferable to configure (or establish) a new connection.

Additionally, if the number of retransmission sessions becomes larger (or longer), the length of the sequence that is used when transmitting the manifold transmission activation indicator may be increased. For example, if the length of the sequence that is used during the first transmission of the manifold transmission activation indicator is equal to L, the length of the sequence that is used during an $m^{th}$ retransmission of the manifold transmission activation indicator may be configured to be equal to mL. As yet another example, if the length of the sequence that is used during the first transmission of the manifold transmission activation indicator is equal to L, the length of the sequence that is used during an $m^{th}$ retransmission of the manifold transmission activation indicator may be configured to be equal to $2^{m-1}$ L.

Additionally, each time the TRP retransmits the manifold transmission activation indicator, the TRP hops the frequency resource. By applying this technique, it will be advantageous in that, when the UE receives the manifold transmission activation indicator, frequency diversity may be additionally gained and that it is likely to avoid interference between the TRPs.

Additionally, during the process of configuring a connection to high reliability service, the UE receives a sequence index that was assigned for the manifold transmission activation indicator and information that is to be used when performing the manifold transmission through L2/L3 signal. By being assigned in advance with a sequence for the manifold transmission activation indicator, the UE may determine later on that the corresponding indicator belongs to the UE. Moreover, since the manifold transmission activation indicator corresponds to 1-bit information, additional information is required to be transmitted in advance to the UE via L2/L3 signaling.

The TRP transmits a list of TRPs within a TRP group, to which signals are to be transmitted during a manifold transmission, and a transmission position of a synchronization signal of each TRP to the UE. After receiving such information, the UE is synchronized in advance with the TRPs within the TRP group. In a next generation wireless communication system, as multiple numerologies are adopted to a single carrier, a plurality of transmission positions for the synchronization signal may exist. Therefore, the transmission positions of the synchronization signal are required to be received along with each TRP list.

Additionally, the sequence index that was assigned for the manifold transmission activation indicator and the information that is to be used when performing the manifold transmission are updated each time a handover is carried out. If the primary TRP of a UE is changed (or switched), the neighboring TRPs of the corresponding TRP are also changed (or switched). Therefore, the sequence index that was assigned for the manifold transmission activation indicator and the information that is to be used when performing the manifold transmission are required to be updated each time a handover is carried out.

Additionally, the resource position, from which the manifold transmission activation indicator is transmitted, is commonly configured within the TRP group, and the TRPs are configured to respectively use sequences that are orthogonal or quasi-orthogonal to one another within the same resource. By doing so, the degradation in the capability of receiving the manifold transmission activation indicator, which is caused by interference occurring between the TRPs, may be reduced. In case TRP 1 transmits the manifold transmission activation indicator and TRP 2 transmits data within a specific resource, the data transmitted from TRP 2 causes interference in the UE, which is receiving the manifold transmission activation indicator from TRP 1. However, if TRP 2 also transmits a manifold transmission activation indicator having an orthogonal characteristic, the level of interference occurring in the UE is reduced.

Additionally, regardless of the success or failure of the UE in receiving the manifold transmission activation indicator, the TRPs within the TRP group performs manifold transmission. This is because, if the UE first verifies (or confirms) that it has successfully received the manifold transmission activation indicator, and, then, activates the manifold transmission afterwards, a time delay occurs. For example, the primary TRP may continuously notify the initiation of the manifold transmission by transmitting the manifold transmission activation indicator, and the secondary TRP(s) may transmit data by using the manifold transmission method regardless of whether or not the UE has successfully received the manifold transmission activation indicator.

The object (or purpose) of the manifold transmission activation indicator is to send an indication so that the UE can initiate (or start) the reception of signals transmitted from multiple TRPs within the TRP group. The object (or purpose) of the base station receiving an ACK for the manifold transmission activation indicator is to enable the base station to continuously transmit the manifold transmission activation indicator until the UE successfully receives the manifold transmission activation indicator. Therefore, for the TRP, the activation of the manifold transmission is immediately performed at a time point, where the primary TRP has sent an indication to the secondary TRPs within the TRP group indicating the activation of the manifold transmission.

—Proposed Technique 2—

As another example, as an additional step of the Proposed Technique 1, in addition to the primary TRP, the UE also transmits an ACK for the manifold transmission activation indicator to another TRP within the TRP group (S1130-2). If the UE successfully detects the manifold transmission activation indicator only after the TRP has transmitted the manifold transmission activation indicator for N number of times, this may correspond to a case where the channel between the UE and the TRP is experiencing deep fading. In this case, the UE is also required to transmit the ACK/NACK several times until the TRP successfully receives the transmitted ACK/NACK. However, since a maximum power of the UE is lower than the maximum power of the TRP, a greater number of transmission sessions performed by the UE for transmitting the ACK/NACK may be required as compared to the number of transmission sessions performed by the TRP for transmitting the manifold transmission activation indicator. In case the channel between the UE and the primary TRP is experiencing deep fading, since it is ineffective in light of the resources to use only the corresponding channel in order to transmit the ACK/NACK, macro diversity may be gained by having the UE transmit the ACK/NACK to all of the TRPs performing the manifold transmission.

If this technique (or method) is applied, the UE that has detected the manifold transmission activation indicator may determine that it is required to transmit the ACK to the TRPs within the TRP group. However, the UE that has failed to detect the manifold transmission activation indicator is incapable of recognizing (or acknowledging) the transmission itself of the ACK/NACK. Therefore, the UE transmits only the ACK to the TRP, and, if the TRP detects a signal, the TRP determines the detected signal as an ACK, and, if the TRP fails to detect a signal, this is determined as a NACK.

For example, an ACK resource for the manifold transmission activation indicator may be configured for each TRP within the TRP group. The ACK resource of each TRP may be determined by using the resource, which is used by the primary TRP when transmitting the manifold transmission activation indicator, and the sequence index. The predetermined (or pre-arranged) rule is received in advance by the UE from the primary TRP via L2/L3 signaling.

If the UE successfully receives the manifold transmission activation indicator, the UE transmits ACK signals to the TRPs within the TRP group via uplink in accordance with the pre-arranged rule. This corresponds to an operation that is performed under the assumption that the secondary TRPs have also initiated the manifold transmission at the same time point where the UE has received the manifold transmission activation indicator. If the manifold transmission is not activated in part of the TRPs, the TRPs in which the manifold transmission is not activated may be incapable of receiving the ACK signal transmitted by the UE.

Moreover, the primary TRP transmits the resource, from which the manifold transmission activation indicator is transmitted, and the sequence index to the secondary TRPs within the TRP group along with the manifold transmission activation indicator. The secondary TRPs that have received such information configure an uplink control channel for receiving the ACK for the manifold transmission activation indicator.

As another example, the TRP group performing the manifold transmission may commonly configure an ACK resource for the manifold transmission activation indicator. The UE receives, in advance, the rule for commonly mapping the manifold transmission activation indicator and the ACK resource within the TRP group from the TRP via L2/L3 signaling. The common ACK resource of the TRP group is determined by the resource and sequence index that were used by the primary TRP when transmitting the manifold transmission activation indicator. The above-described technique (or method) corresponds to a technique that can be performed when time-synchronization and frequency-synchronization are established between the TRPs. In this case, if the ACK resource is commonly configured for the TRP group, it will be advantageous in that the UE can gain macro diversity even by performing uplink transmission only once. However, this method has a disadvantage in that it is technically difficult to match the frequency-synchronization between the multiple TRPs.

Furthermore, the lower level methods (or techniques) that are described in the Proposed Technique 1 may also be applied in the Proposed Technique 2.

Figure 12:
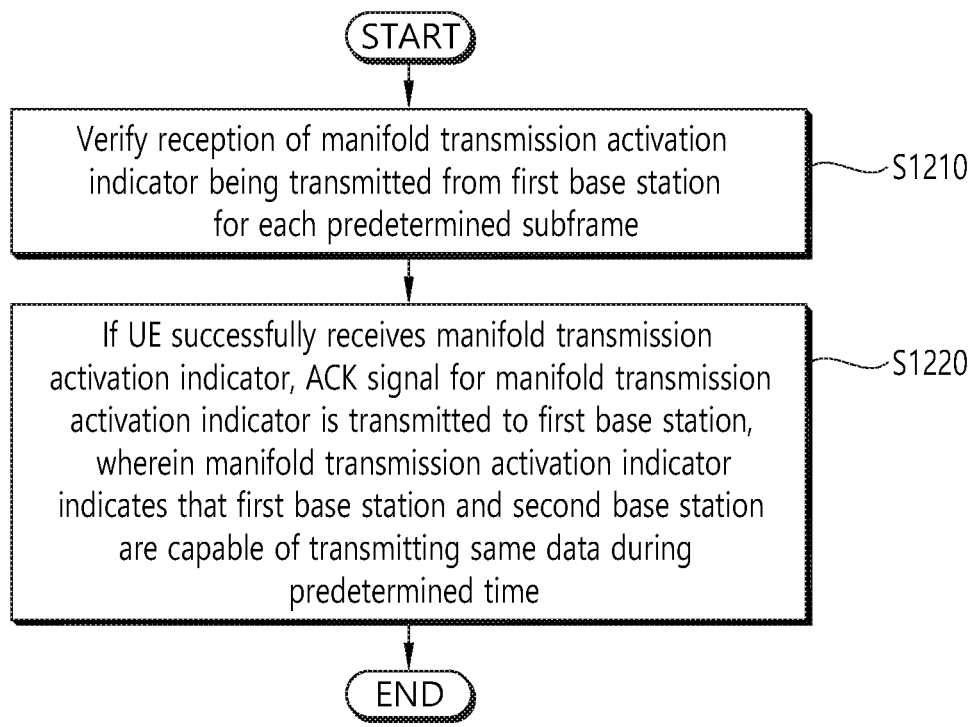
FIG. 12 is a flow chart showing a procedure for receiving a signal in a wireless communication system applying a manifold transmission technique according to an exemplary embodiment of this specification.

FIG. 12 is a flow chart showing a procedure for receiving a signal in a wireless communication system applying a manifold transmission technique according to an exemplary embodiment of this specification.

The terms will first be described. A manifold transmission (or multiple transmission) method (or technique) refers to a technique for maximizing the number of signal transmission sessions and diversity within a limited time by using multiple paths. The manifold transmission may also be referred to multi-path transmission or manifold transmission. A first base station may correspond to the primary TRP, and a second base station may correspond to the secondary TRP. In this specification, a subframe may be replaced with a slot.

Firstly, in step S1210, the UE verifies a reception of a manifold transmission activation indicator, which is transmitted from a first base station at each predetermined subframe. The predetermined subframe may correspond to a predetermined time. The manifold transmission activation indicator indicates that the first base station and a second base station may transmit the same data during a predetermined time.

In step S1220, if the UE successfully receives the manifold transmission activation indicator, the UE transmits an ACK signal for the manifold transmission activation indicator to the first base station.

More specifically, the first base station may periodically transmit the manifold transmission activation indicator to the UE at a predetermined time interval. In other words, the first base station may notify the initiation (or activation) of the manifold transmitted to the UE through the manifold transmission activation indicator.

In order to allow the manifold transmission technique (or method) to be carried out preferably, the UE should receive the manifold transmission activation indicator with reliability. Therefore, the first base station should periodically transmit a manifold transmission activation indicator, and the UE should transmit an ACK signal for the received manifold transmission activation indicator even if the manifold transmission activation indicator corresponds to a control signal.

Thus, the UE may collectively receive the data being transmitted from the first base station and the second base station through multiple paths (a path between the UE and the first base station and a path between the UE and the second base station), without establishing any inter-cell cooperation between the first base station and the second base station.

Additionally, the manifold transmission method may use two level DCI. Herein, the manifold transmission activation indicator may be delivered by using level 1 DCI, and control information (scheduling information) for the transmission of a transport block may be delivered by using level 2 DCI.

Additionally, the manifold transmission activation indicator may be transmitted by using a sequence. At this point, the UE may calculate an auto-correlation value of the corresponding sequence. If the calculated auto-correlation value is equal to or greater than a threshold value, it will be determined that the manifold transmission activation indicator has been successfully received. Thus, the UE may determine that the manifold transmission is activated.

Additionally, the control information for the data transmission may be received through the predetermined subframe along with the manifold transmission activation indicator. The predetermined subframe may correspond to a self-contained subframe. More specifically, the predetermined subframe may include a symbol transmitting downlink control information, a symbol transmitting the data, and a symbol transmitting the uplink control information channel. In case of a self-contained subframe in the TDD communication system, the symbol transmitting downlink control information, the symbol transmitting the data, and the symbol transmitting the uplink control information channel of the predetermined subframe may each be positioned in a time-division format.

At this point, the manifold transmission activation indicator and the control information for transmitting the data may be received through a symbol transmitting the downlink control information. More specifically, the control information for the data transmission may be transmitted through the same control channel (e.g., PDCCH) along with the manifold transmission activation indicator. In this case, the UE may be assigned with both an ACK/NACK resource for the data and an ACK/NACK resource for the manifold transmission activation indicator. In other words, an ACK signal for the data and an ACK signal for the manifold transmission activation indicator may be transmitted through the symbol transmitting the uplink control information. Accordingly, a manifold transmission activation indicator and an ACK signal for the manifold transmission activation indicator may be transmitted through the same self-contained subframe.

Additionally, the symbol transmitting the downlink control information may be configured of at least two Orthogonal Frequency Division Multiplexing (OFDM) symbols, or the symbol transmitting the uplink control information may be configured of at least two OFDM symbols. This is to ensure that, if the first base station fails to receive the ACK signal for the manifold transmission activation indicator, a time interval between a time point where the ACK signal is received and a time point where the manifold transmission activation indicator is retransmitted is equivalent to at least one OFDM symbol. Thus, the encoding time for retransmitting the manifold transmission activation indicator may be ensured.

Additionally, a position of a resource from which the ACK signal for the manifold transmission activation indicator may be determined based on an index of the resource from which the manifold transmission activation indicator is transmitted and a sequence number of the manifold transmission activation indicator.

Additionally, the first base station and the second base station may be included in a base station group supporting the manifold transmission. The UE may receive information on the base station group, information on a resource position of a synchronization signal being transmitted by the first base station, and information on a resource position of a synchronization signal being transmitted by the second base station from the first base station. Based on the information on a resource position of a synchronization signal being transmitted by the first base station and the information on a resource position of a synchronization signal being transmitted by the second base station, the first base station and the second base station may be synchronization. In the next generation wireless communication system, as multiple numerologies are adopted to a single carrier, the transmission resource position from which the synchronization signal is transmitted may differ in each base station. Therefore, the UE is required to receive the information on the resource position of a synchronization signal along with information on a base station group including a list indicating each of the base stations.

Additionally, the manifold transmission activation indicator may be transmitted by using sequences that are orthogonal or quasi-orthogonal to one another through a resource being commonly assigned to the first base station and the second base station. Even if the manifold transmission activation indicator is transmitted from each base station through the same resource, since sequences being orthogonal or quasi-orthogonal to one another are used, the interference between each of the base station may be prevented.

Additionally, if the UE successfully receives the manifold transmission activation indicator, the UE may also transmit an ACK signal for the manifold transmission activation indicator to the second base station. This is to allow the UE to gain macro diversity by transmitting ACK signals to all of the base stations performing the manifold transmission.

An ACK signal for the manifold transmission activation indicator may be transmitted to each of the first base station and the second base station frim resources respectively configured to the corresponding base station, or an ACK signal for the manifold transmission activation indicator may be transmitted from a resource that is commonly assigned to both the first base station and the second base station. A resource from which an ACK signal for the manifold transmission activation indicator is being transmitted may be determined by using a resource that is used by the first base station when transmitting the manifold transmission activation indicator and a sequence index. The pre-arranged rule is received in advance by the UE from the first base station via L2/L3 signaling.

Furthermore, a procedure for updating the TRP group for the manifold transmission may be required prior to performing the above-described operations.

The UE may receive a request for a channel quality value corresponding to a base station group, to which the manifold transmission method is applied, from the first base station. Thereafter, the UE may update the channel quality value corresponding to the base station group and may then transmit the updated channel quality value to the first base station. The UE may receive, from the first base station, identification information of the second base station, which is selected by the first base station, among the base station group. Thus, the UE may know (or acknowledge) that the second base station is included in the base station group for performing the manifold transmission.

Figure 13:
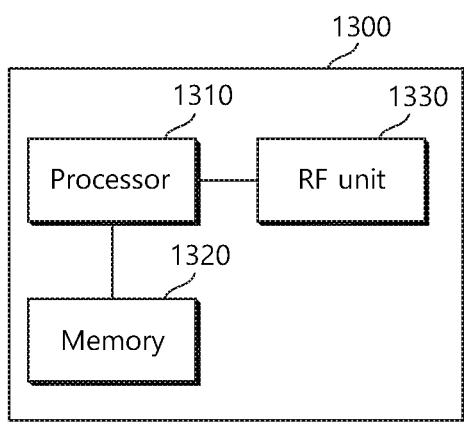
FIG. 13 is a block diagram showing an apparatus for wireless communication for implementing an embodiment of the present invention.

FIG. 13 is a block diagram showing an apparatus for wireless communication for implementing an embodiment of the present invention.

An apparatus (1300) for wireless communication includes a processor (1310), a memory (1320), and a radio frequency (RF) unit (1330).

The processor (1310) may be configured to implement proposed functions, procedures and/or methods described in this description. Layers of the radio interface protocol may be implemented in the processor (1310). The processor (1310) may handle a procedure explained above. The memory (1320) is operatively coupled with the processor (1310), and the RF unit (1330) is operatively coupled with the processor (1310).

The processor (1310) may include application-specific integrated circuit (ASIC), other chipset, logic circuit and/or data processing device. The memory (1320) may include read-only memory (ROM), random access memory (RAM), flash memory, memory card, storage medium and/or other storage device. The RF unit (1330) may include baseband circuitry to process radio frequency signals. When the embodiments are implemented in software, the techniques described herein can be implemented with modules (e.g., procedures, functions, and so on) that perform the functions described herein. The modules can be stored in the memory (1320) and executed by the processor (1310). The memory (1320) can be implemented within the processor (1310) or external to the processor (1310) in which case those can be communicatively coupled to the processor (1310) via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for receiving a signal in a wireless communication system applying a multi-path transmission technique, the method comprising:
    monitoring reception of a multi-path transmission activation indicator being transmitted from a first base station at each predetermined subframe; and
    based on a user equipment (UE) successfully receiving the multi-path transmission activation indicator, transmitting an acknowledgement (ACK) signal for the multi-path transmission activation indicator to the first base station,
    wherein the multi-path transmission activation indicator indicates that the first base station and the second base station are capable of transmitting the same data during a predetermined time,
    wherein the multi-path transmission activation indicator is transmitted by using a sequence, and
    wherein the method further comprises calculating an auto-correlation value of the sequence,
    wherein, based on the calculated auto-correlation value of the sequence being equal to or greater than a threshold value, the multi-path transmission activation indicator is acknowledged to be successfully received.

2. The method of claim 1, wherein control information for transmitting the data is received through the predetermined subframe along with the multi-path transmission activation indicator.

3. The method of claim 2,
    wherein the predetermined subframe includes a symbol transmitting downlink control information, a symbol transmitting the data, and a symbol transmitting uplink control information,
    wherein the multi-path transmission activation indicator and the control information for transmitting the data are received through the symbol transmitting downlink control information, and
    wherein an ACK signal for the data and the ACK signal for the multi-path transmission activation indicator are transmitted through the symbol transmitting uplink control information.

4. The method of claim 3,
    wherein the symbol transmitting downlink control information is configured of at least two Orthogonal Frequency Division Multiplexing (OFDM) symbols, or
    wherein the symbol transmitting uplink control information is configured of at least two OFDM symbols.

5. The method of claim 1, wherein a position of a resource from which an ACK signal for the multi-path transmission activation indicator is transmitted is determined based on an index of the resource from which the multi-path transmission activation indicator is transmitted and a sequence number of the multi-path transmission activation indicator.

6. The method of claim 1,
wherein the first base station and the second base station are included in a base station group supporting multi-path transmission, and
wherein the method further comprises:
receiving information on the base station group from the first base station, resource position information of a synchronization signal being transmitted from the first base station, and resource position information of a synchronization signal being transmitted from the second base station; and
synchronizing the first base station and the second base station based on the resource position information of the synchronization signal being transmitted from the first base station and the resource position information of the synchronization signal being transmitted from the second base station.

7. The method of claim 1, wherein the sequence comprises plural sequences being orthogonal or quasi-orthogonal to one another through a resource being commonly assigned to the first base station and the second base station.

8. The method of claim 1, further comprising:
based on the UE successfully receiving the multi-path transmission activation indicator, transmitting an ACK signal for the multi-path transmission activation indicator to the second base station.

9. The method of claim 8, wherein the ACK signal for the multi-path transmission activation indicator is transmitted through resources respectively being assigned to the first base station and the second base station or transmitted through a resource being commonly assigned to the first base station and the second base station.

10. A user equipment (UE) for receiving a signal in a wireless communication system applying a multi-path transmission technique, comprising:
a radio frequency (RF) unit including a transceiver for transmitting and receiving radio signals; and
a processor being operatively connected to the RF unit, wherein the processor:

monitors reception of a multi-path transmission activation indicator being transmitted from a first base station at each predetermined subframe; and
based on a user equipment (UE) successfully receiving the multi-path transmission activation indicator, transmits an acknowledgement (ACK) signal for the multi-path transmission activation indicator to the first base station,
wherein the multi-path transmission activation indicator indicates that the first base station and the second base station are capable of transmitting the same data during a predetermined time,
wherein the multi-path transmission activation indicator is transmitted by using a sequence,
wherein the processor calculates an auto-correlation value of the sequence, and
wherein, based the calculated auto-correlation value of the sequence being equal to or greater than a threshold value, the multi-path transmission activation indicator is acknowledged to be successfully received.

11. The user equipment of claim 10, wherein control information for transmitting the data is received through the predetermined subframe along with the multi-path transmission activation indicator.

12. The user equipment of claim 11,
wherein the predetermined subframe includes a symbol transmitting downlink control information, a symbol transmitting the data, and a symbol transmitting uplink control information,
wherein the multi-path transmission activation indicator and the control information for transmitting the data are received through the symbol transmitting downlink control information, and
wherein an ACK signal for the data and the ACK signal for the multi-path transmission activation indicator are transmitted through the symbol transmitting uplink control information.

13. The user equipment of claim 12,
wherein the symbol transmitting downlink control information is configured of at least two Orthogonal Frequency Division Multiplexing (OFDM) symbols, or
wherein the symbol transmitting uplink control information is configured of at least two OFDM symbols.

* * * * *